United States Patent
Sasaki et al.

(10) Patent No.: US 9,465,164 B2
(45) Date of Patent: Oct. 11, 2016

(54) ELECTRONIC APPARATUS, METHOD FOR MANUFACTURING ELECTRONIC APPARATUS, AND ELECTRONIC DEVICE

(71) Applicant: FUJITSU LIMITED, Kawasaki-shi, Kanagawa (JP)

(72) Inventors: Shinya Sasaki, Ebina (JP); Akio Sugama, Atsugi (JP)

(73) Assignee: FUJITSU LIMITED, Kawasaki (JP)

(*) Notice: Subject to any disclaimer, the term of this patent is extended or adjusted under 35 U.S.C. 154(b) by 46 days.

(21) Appl. No.: 14/198,221

(22) Filed: Mar. 5, 2014

(65) Prior Publication Data

US 2014/0301696 A1    Oct. 9, 2014

(30) Foreign Application Priority Data

Apr. 4, 2013  (JP) .................................. 2013-078398

(51) Int. Cl.
  *G02B 6/12* (2006.01)
  *G02B 6/13* (2006.01)
  *G02B 6/42* (2006.01)
  *G02B 6/43* (2006.01)

(52) U.S. Cl.
  CPC .............. *G02B 6/13* (2013.01); *G02B 6/4214* (2013.01); *G02B 6/43* (2013.01); *Y10T 29/4913* (2015.01)

(58) Field of Classification Search
  CPC ................................... G02B 6/43; G02B 6/13
  USPC ......................................................... 385/14
  See application file for complete search history.

(56) References Cited

U.S. PATENT DOCUMENTS

| | | | | |
|---|---|---|---|---|
| 5,987,202 A * | 11/1999 | Gruenwald et al. | ............. | 385/49 |
| 6,343,164 B1 * | 1/2002 | Robertsson et al. | ............. | 385/14 |
| 6,603,915 B2 * | 8/2003 | Glebov et al. | ................ | 385/129 |
| 6,955,481 B2 * | 10/2005 | Colgan et al. | .................. | 385/89 |
| 7,005,719 B2 * | 2/2006 | Masumoto | ..................... | 257/432 |
| 7,306,378 B2 * | 12/2007 | Alduino et al. | ................ | 385/88 |
| 7,350,982 B2 * | 4/2008 | Ohtsu | .................. | G02B 6/1221 385/129 |
| 7,359,590 B2 * | 4/2008 | Hsu | ............................... | 385/14 |

(Continued)

FOREIGN PATENT DOCUMENTS

| | | |
|---|---|---|
| JP | 2003-197850 | 7/2003 |
| JP | 2007-271998 | 10/2007 |
| TW | 201222034 | 6/2012 |

OTHER PUBLICATIONS

TWOA—Office Action of Taiwanese Patent Application No. 103107668 dated Dec. 11, 2014, with English translation of the Examiner's opinions regarding the cited reference in the Official Letter.

(Continued)

*Primary Examiner* — Rhonda Peace
(74) *Attorney, Agent, or Firm* — Fujitsu Patent Center

(57) ABSTRACT

Disclosed is an electronic apparatus including a circuit element including a first main surface, a first electrode provided in the first main surface, an optical element including a second main surface and being configured to either transmit or receive an optical signal, a second electrode provided in the second main surface, a window which is provided in the second main surface and through which the optical signal passes, a wiring layer provided on the first main surface and the second main surface, the wiring layer electrically connecting the first electrode and the second electrode, and an optical waveguide, which is provided on the second main surface and optically connected to the window, the optical signal passing through the optical waveguide.

7 Claims, 14 Drawing Sheets

(56) References Cited

U.S. PATENT DOCUMENTS

| | | | |
|---|---|---|---|
| 7,367,715 B1* | 5/2008 | Budd et al. | 385/88 |
| 7,369,718 B2* | 5/2008 | George et al. | 385/14 |
| 7,519,244 B2* | 4/2009 | Hsu | 385/14 |
| 7,731,430 B2* | 6/2010 | Ohtsu et al. | 385/88 |
| 8,390,083 B2* | 3/2013 | O'Donnell | B81C 1/0023 257/414 |
| 9,025,916 B2* | 5/2015 | Tseng | 385/31 |
| 9,105,766 B2* | 8/2015 | Coffy | G01S 7/481 |
| 2003/0103712 A1* | 6/2003 | Glebov et al. | 385/14 |
| 2005/0058408 A1* | 3/2005 | Colgan et al. | 385/89 |
| 2005/0189631 A1* | 9/2005 | Masumoto | 257/678 |
| 2007/0019899 A1* | 1/2007 | Ohtsu et al. | 385/14 |
| 2007/0104412 A1* | 5/2007 | Hsu | 385/14 |
| 2007/0292081 A1 | 12/2007 | Hashimoto et al. | |
| 2014/0301696 A1* | 10/2014 | Sasaki et al. | 385/14 |

OTHER PUBLICATIONS

CNOA—Office Action of Chinese Patent Application No. 201410123469.4 dated May 31, 2016, with Full translation of the Office Action.

* cited by examiner

ELECTRONIC APPARATUS, METHOD FOR MANUFACTURING ELECTRONIC APPARATUS, AND ELECTRONIC DEVICE

CROSS-REFERENCE TO RELATED APPLICATION

This application is based upon and claims the benefit of priority of the prior Japanese Patent Application No. 2013-078398, filed on Apr. 4, 2013, the entire contents of which are incorporated herein by reference.

FIELD

The present embodiments discussed herein are related to an electronic apparatus, a method for manufacturing an electronic apparatus, and an electronic device.

BACKGROUND

In the field of the electronic device such as a server, focus is paid on an optical transmission technique in which a plurality of server racks are connected one another with an optical fiber, in order to increase the speed of signal transmission in the electronic device.

In the optical transmission technique, an optical element configured to transmit and receive optical signals and a circuit element, such as a drive IC, configured to drive the optical element are used, and the optical element is optically connected to the optical fiber.

The optical element and the circuit element are connected to each other with a metal wire. The metal wire is preferable to be as short as possible to reduce wiring delay so that faster signal transmission can be achieved.

Moreover, the optical transmission technique has room for improvement also in view of reduction in optical signal loss.

SUMMARY

According to one aspect discussed herein, there is provided an electronic apparatus including a circuit element including a first main surface, a first electrode provided in the first main surface, an optical element including a second main surface and being configured to either transmit or receive an optical signal, a second electrode provided in the second main surface, a window which is provided in the second main surface and through which the optical signal passes, a wiring layer provided on the first main surface and the second main surface, the wiring layer electrically connecting the first electrode and the second electrode, and an optical waveguide, which is provided on the second main surface and optically connected to the window, the optical signal passing through the optical waveguide.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Before describing the present embodiment, a description is given of results of a study carried out by the inventors.

It is effective to use an optical transmission technique in order to speed up signal transmission in an electronic device. In the optical transmission technique, an optical element such as a vertical cavity surface emitting laser (VCSEL) or a photodiode (PD), and a circuit element such as a driver for driving the optical element or a transimpedance amplifier (TIA), are used in combination.

Figure 1:
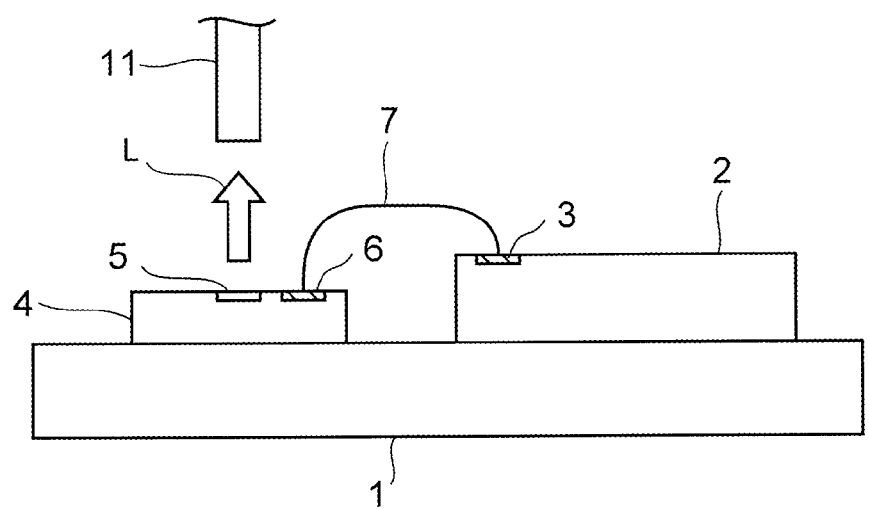
FIG. 1 is a sectional view of an optical element and a circuit element in an electronic device.

FIG. 1 is a sectional view of the optical element and the circuit element in an electronic device.

In the example illustrated in FIG. 1, a circuit element 2 and an optical element 4 are fixed onto a wiring substrate 1, and an electrode 3 of the circuit element 2 and an electrode 6 of the optical element 4 are electrically connected to each other with a bonding wire 7 such as a gold wire.

The optical element 4 is, for example, a vertical cavity surface emitting laser. The optical element 4 is provided with an optically-transparent window 5 on its upper surface and emits an optical signal L through the window 5 in a direction normal to the wiring substrate 1. This optical signal L is outputted to the outside via an optical fiber 11 provided above the window 5.

In such a structure, the alignment between the optical fiber 11 and the optical element 4 has to be performed correctly in order to reduce optical signal loss between them.

Further, wiring delay occurs according to the length of the bonding wire 7 in this example, which makes it difficult to transmit signals at a high speed between the circuit element 2 and the optical element 4.

Figure 2:
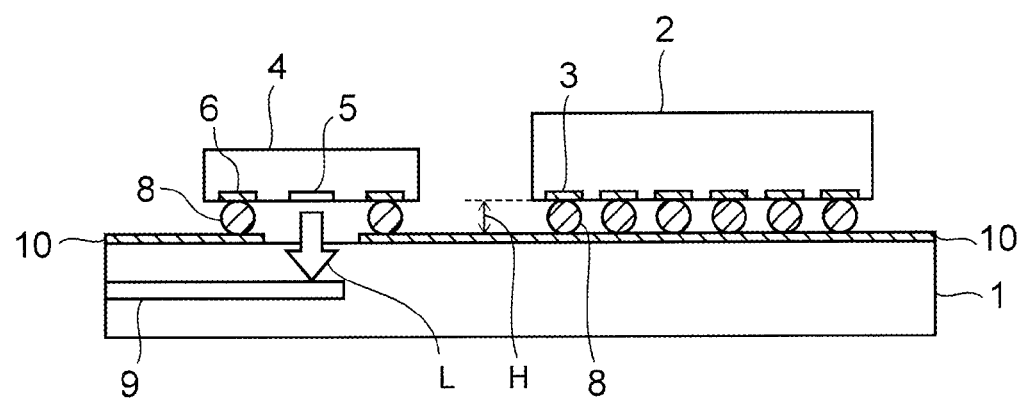
FIG. 2 is a sectional view illustrating the case where a circuit element and an optical element are flip-chip mounted on a wiring substrate.

FIG. 2 is a sectional view illustrating the case where the circuit element 2 and the optical element 4 are flip-chip mounted on the wiring substrate 1 in order to reduce such wiring delay.

In this example, as connecting terminals 8, solder bumps are joined onto each of the electrodes 3, 6. Then, via these connecting terminals 8, a wiring layer 10 of the wiring substrate 1 and the circuit element 2 are connected with each other. Also, the wiring layer 10 and the optical element 4 are connected via the connecting terminals 8.

A height H of the connecting terminal 8 is about several 100 μm, which is lower than the length (about 1 mm to 2 mm) of the bonding wire 7 in FIG. 1. Therefore, wiring delay due to the height H of the connecting terminal 8 is less than that caused in the example illustrated in FIG. 1.

In this structure, the window 5 of the optical element 4 is often provided at the same side where the electrodes 6 are provided. In this case, the optical signal L is emitted through the window 5 toward the wiring substrate 1. For this reason, in this example, an optical waveguide 9 is provided in the wiring substrate 1 to output the optical signal L to the outside, and the wiring substrate 1 and the optical element 4 are aligned so that the window 5 is located above the optical waveguide 9.

In order to prevent loss of the optical signal L, the amount of misalignment between the window 5 and the optical waveguide 9 has to be within 10 μm in a lateral direction of the substrate. However, it is difficult to align the window 5 and the optical waveguide 9 with such a high precision. Especially, in flip-chip mounting, the optical element 4 moves slightly by its own weight when the connecting terminals 8 are melted during reflow. This makes it even harder to align the optical element 4 and the wiring substrate 1.

A description is given below of a present embodiment capable of reducing wiring delay and optical signal loss.

Embodiment

Figure 3:
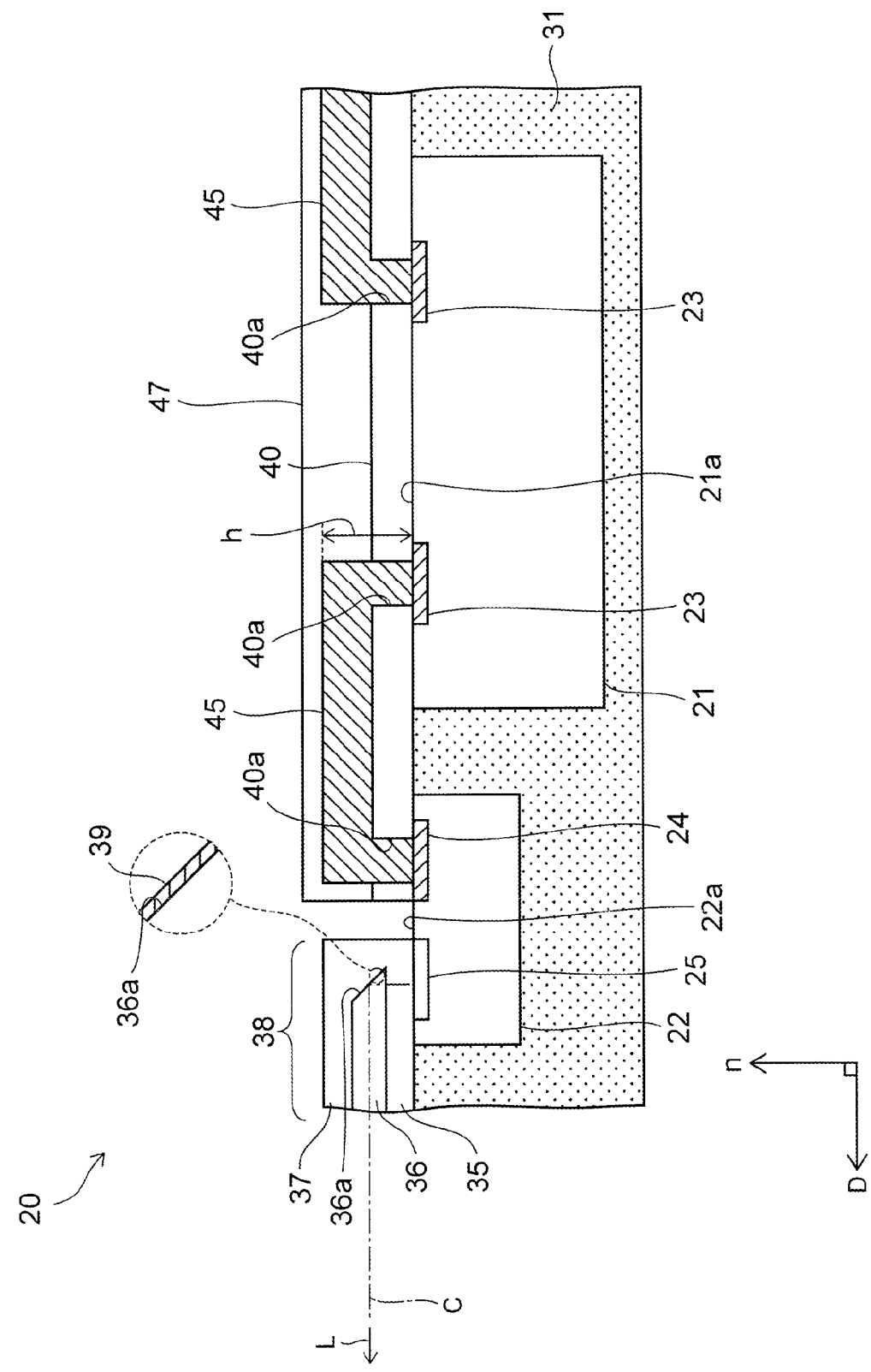
FIG. 3 is an enlarged sectional view of an electronic apparatus according to the present embodiment.

FIG. 3 is an enlarged sectional view of an electronic apparatus according to the present embodiment.

An electronic apparatus 20 is configured to transmit and receive optical signals in the optical transmission technique, and has a circuit element 21 and an optical element 22.

The circuit element 21 has a first main surface 21a where first electrodes 23 made of copper are provided.

The circuit element 21 is not particularly limited. Any one of a driver configured to drive the optical element 22, a transimpedance amplifier, a CPU (central processing unit), a GPU (graphical processing unit), a resistance element, a capacitor, and an inductor is usable as the circuit element 21.

The optical element 22 also has a second main surface 22a where second electrodes 24 made of copper and a window 25 made of optically-transparent silicon oxide or the like are provided.

The optical element 22 is a light-emitting or light-receiving element configured to transmit or receive an optical signal L through the window 25, and is made of a semiconductor material such as silicon or gallium arsenide. Among them, as for the light-emitting element, a vertical cavity surface emitting laser and an LED (light-emitting device) are available, and as for the light-receiving element, a photodiode (PD) is available. In addition, an optical sensor may be used as the optical element 22.

In any these optical elements, a direction of the optical signal L passing through the window 25 is directed toward the normal direction n of the second main surface 22a. In the following, the description is given for the case where a vertical cavity surface emitting laser element is used as the optical element 22.

Figure 4:
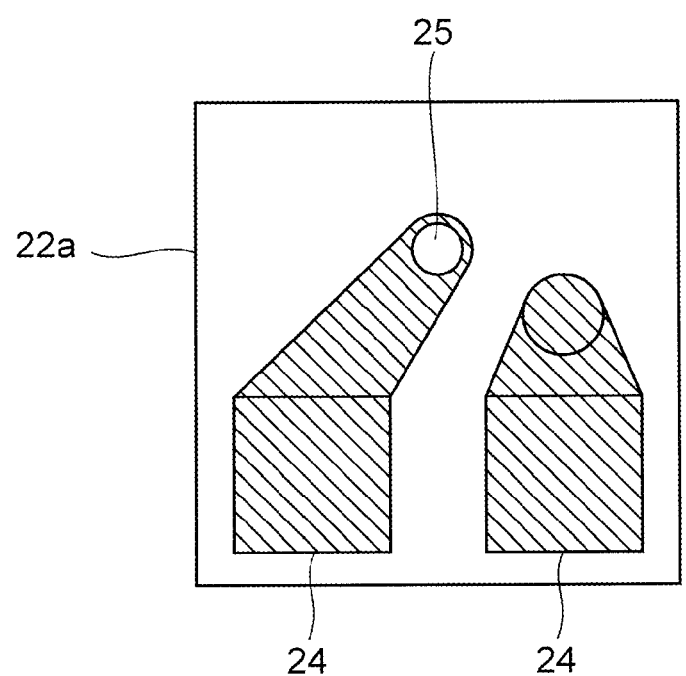
FIG. 4 is a plan view illustrating an example of a second main surface of an optical element according to the present embodiment.

FIG. 4 is a plan view illustrating an example of the second main surface 22a of the optical element 22.

As illustrated in FIG. 4, two second electrodes 24 are provided in the second main surface 22a. One of the second electrode 24 is used as a positive electrode, and the other second electrode 24 is used as a negative electrode.

Again, FIG. 3 is referred.

On the second main surface 22a, an optical waveguide 38 optically connected to the window 25 is provided. The optical waveguide 38 is formed by stacking a lower cladding layer 35, a core layer 36, and an upper cladding layer 37 in the order, and extends in an in-plane direction D of the second main surface 22a.

The core layer 36 is part of an optical path C along which the optical signal L propagates, and has a mirror face 36a at an end portion thereof. The mirror face 36a is located above the window 25 and configured to reflect the optical signal L. The mirror face 36a allows the optical signal L to be interchanged between the optical element 22 and the optical waveguide 38 by bending the optical path C from the normal direction n to the in-plane direction D of the second main surface 22a.

Note that, in order to improve the reflectivity of the mirror face 36a for the optical signal L, a reflective film 39, such as a gold film, may be formed on the mirror face 36a, as illustrated in a dotted-line circle.

As a first insulating layer 40, a resin layer of about 8 μm thickness is provided on the first main surface 21a and the second main surface 22a. Further, a wiring layer 45 made of copper is formed on the first insulating layer 40.

The wiring layer 45 is formed by a rewiring technique, and is formed after the circuit element 21 and the optical element 22 are completed, in a step different from a step for forming wiring (not illustrated) incorporated by these elements re and 22.

The first insulating layer 40 has openings 40a of about 30 μm diameter above each of the electrodes 23, 24, and the wiring layer 45 is formed also in these openings 40a. Thus, the wiring layer 45 is connected to the first electrodes 23 and the second electrodes 24 in the openings 40a, and thereby these electrodes 23, 24 are electrically connected each other.

On the first insulating layer 40 and the wiring layer 45, a resin layer is formed as a second insulating layer 47 to protect the wiring layer 45 from outside atmosphere.

Moreover, a sealer 31 is provided around the circuit element 21 and the optical element 22. The sealer 31 is formed for protecting the circuit element 21 and the optical element 22 from outside atmosphere, and is formed by a molded resin.

According to the electronic apparatus 20, the circuit element 21 and the optical element 22 are electrically connected each other by the wiring layer 45 that is formed by the rewiring technique as described above.

In the rewiring technique, the first insulating layer 40 and the wiring layer 45 are formed by a coating method or electrolytic plating that is advantageous for forming thin films. Thus, a height h of the wiring layer 45 measured from a surface of each electrode 23, 24 can be as low as about 5 μm. This value is much lower than the height H of the connecting terminal 8 (several 100 μm) in FIG. 2, and therefore contributes to sufficient reduction in the wiring delay due to the height h of the wiring layer 45.

Moreover, in this electronic apparatus 20, the optical waveguide 38 is provided on the second main surface 22a of the optical element 22. Thus, there is no need for employing a technique for co-mounting the optical element 22 and the optical waveguide 38, such as flip-chip mounting, with which it is difficult to achieve high-precision alignment. This enables accurate alignment between the optical waveguide 38 and the window 25, allowing suppression of loss of the optical signal L between the optical waveguide 38 and the window 25.

Furthermore, the optical waveguide 38 is in contact with the window 25, and there is no other media such as air interposed between the optical waveguide 38 and the window 25. Therefore, the optical signal L can be efficiently transmitted or received between the optical waveguide 38 and the window 25, which allows further suppression of loss of the optical signal L.

Next, a description is given of how the electronic apparatus 20 is used.

Figure 5:
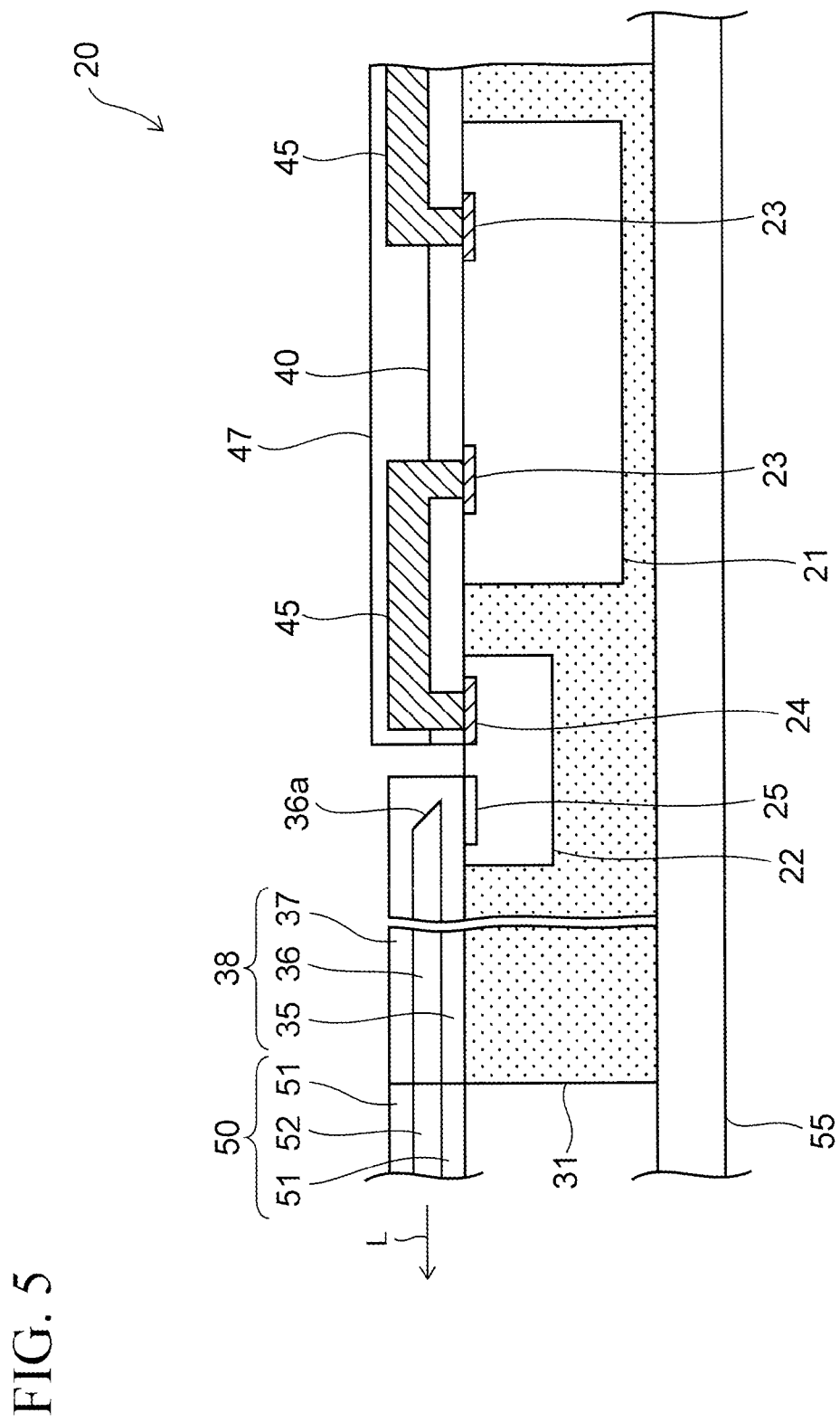
FIG. 5 is a sectional view illustrating how the electronic apparatus according to the present embodiment is used.

FIG. 5 is a sectional view illustrating how the electronic apparatus according to the present embodiment is used. Note that elements in FIG. 5 that are the same as those described in FIGS. 3 and 4 are denoted by the same references used in these figures, and their description is omitted in the following.

As illustrated in FIG. 5, in an actual usage, the electronic apparatus 20 is mounted on a wiring substrate 55 by an adhesive (not illustrated), and an optical fiber 50 is optically connected to the optical waveguide 38. Note that in order to optically connect the optical waveguide 38 and the optical fiber 50 together, end faces of the waveguide 38 and the optical fiber 50 are bonded using an optical adhesive.

The optical fiber 50 has a cladding material 51 and a core 52, and the electronic apparatus 20 transmits or receives the optical signal L to or from an external electronic device via the core 52.

Figure 6:
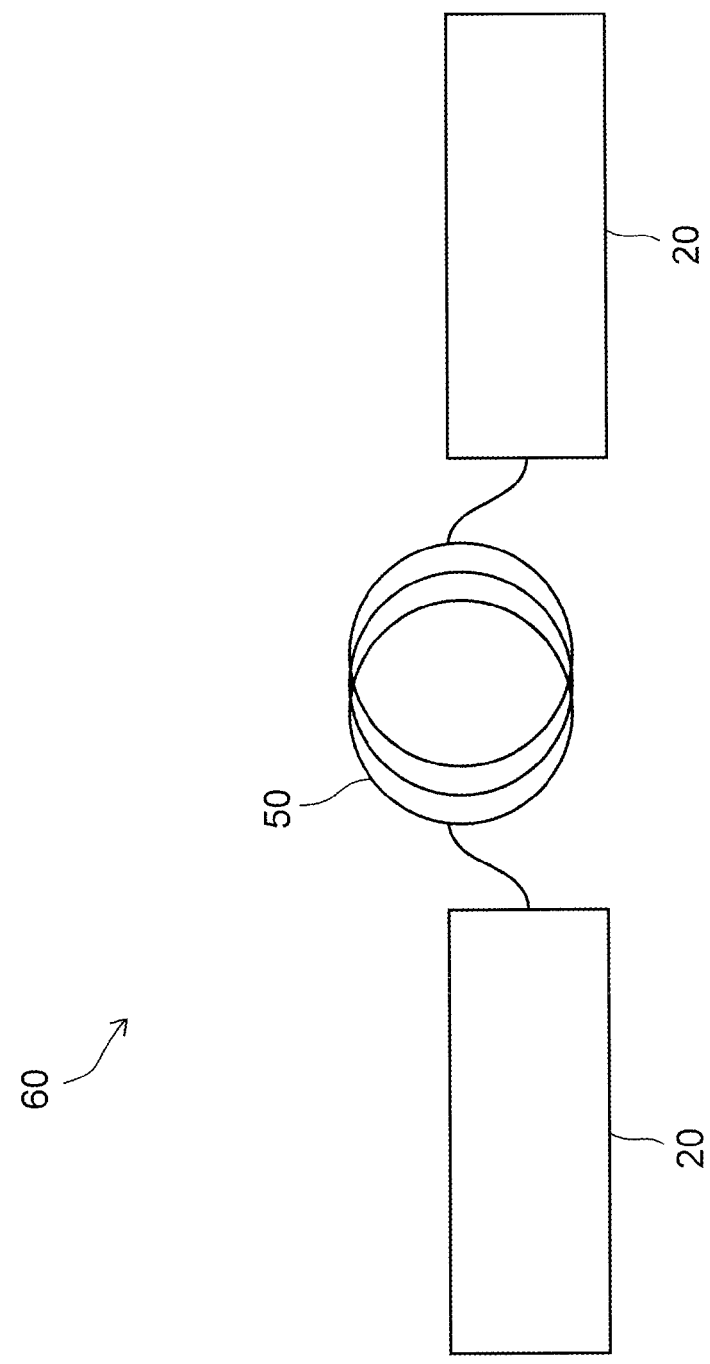
FIG. 6 is a schematic view illustrating an example of an electronic device including the electronic apparatus according to the present embodiment.

FIG. 6 is a schematic diagram illustrating an example of an electronic device including the electronic apparatus 20.

Note that elements in FIG. 6 that are the same as those described in FIGS. 3 to 5 are denoted by the same references used in FIGS. 3 to 5, and their description is omitted in the following.

This electronic device 60 is an AOC (active optical cable) that optically connects two electronic apparatuses 20 using the optical fiber 50 in FIG. 5.

The electronic apparatus 20 used for the AOC is also called an optical transceiver. When the electronic apparatuses 20 are used in the AOC, optical signals are transmitted and received between optical elements 22 by using a light-emitting element as the optical element 22 of one of the electronic apparatuses 20 (See FIG. 5) and a light-receiving element as the optical element 22 of the other electronic apparatus 20.

Figure 7:
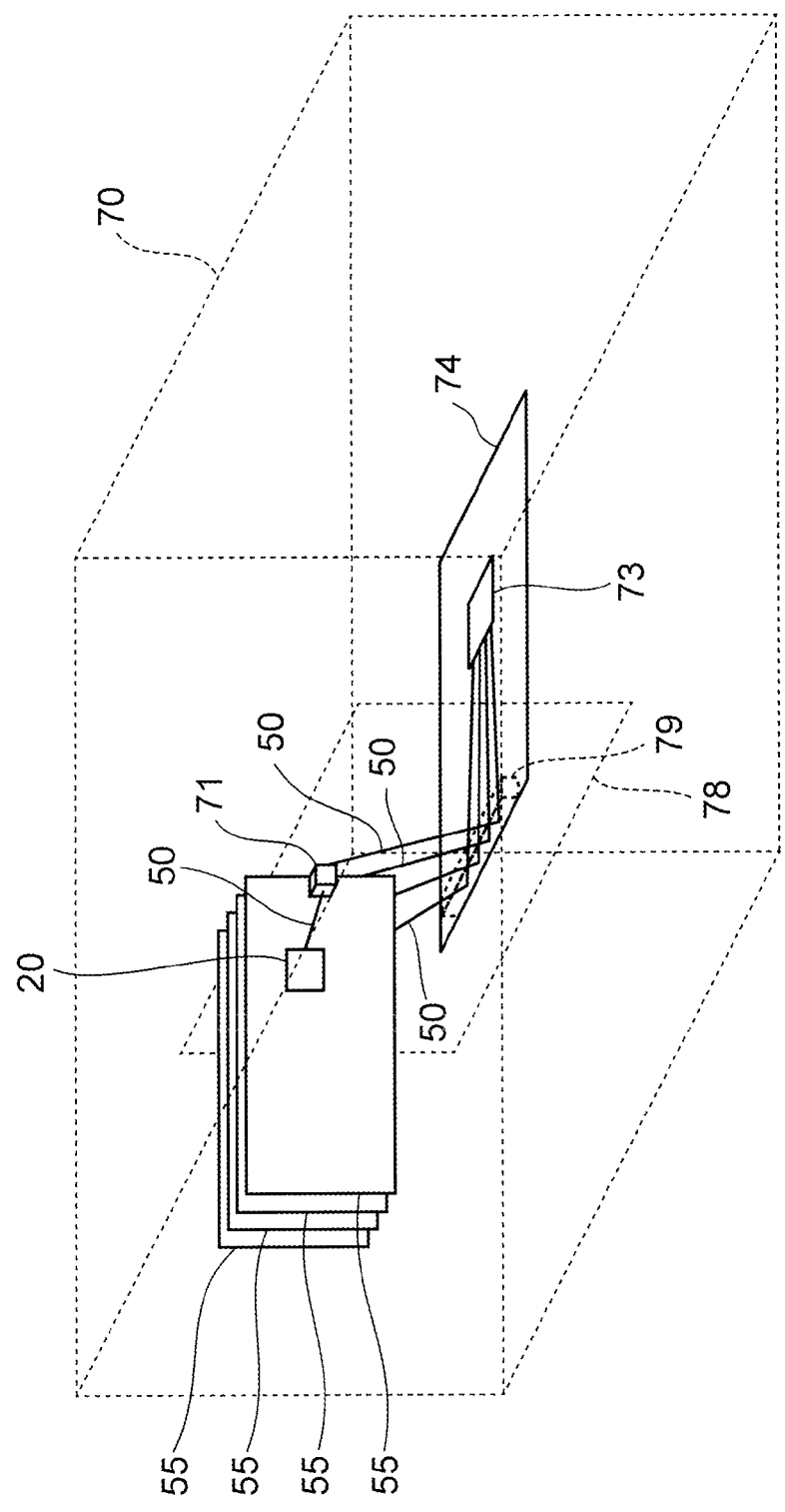
FIG. 7 is a schematic view illustrating another example of an electronic device including the electronic apparatus according to the present embodiment.

FIG. 7 is a schematic diagram illustrating another example of an electronic device including the electronic apparatus 20.

Note that elements in FIG. 7 that are the same as those described in FIGS. 3 to 6 are denoted by the same references used in these figures, and their description is omitted in the following.

This electronic device 70 is a server and has a plurality of wiring substrates 55 and a switch blade 74. Each wiring substrate 55 is served as a server blade, and the electronic apparatus 20 is mounted on the wiring substrates 55.

The optical fiber 50 connected to the electronic apparatus 20 is drawn to a backplane 78 via a first optical connector 71, and then connected to a transmitting and receiving circuit 73 of the switch blade 74 via a second optical connector 79.

The transmitting and receiving circuit 73 has a function of performing switching optical signals among the plurality of optical fibers 50. Thus, the electronic apparatuses 20 of the wiring substrates 55 are optically connected one another.

According to the electronic device 70, the wiring substrates 55 are connected together via the optical fibers 50. Thereby, signals can be transmitted and received at a high speed among the wiring substrates 55, and hence high functionality and high performance of the servers can be achieved.

Furthermore, since wiring delay and optical signal loss are reduced in the electronic apparatuses 20 as described above, the wiring substrates 55 can be optically connected to one another with sufficiently strong optical signals while achieving high speed signal transmission.

Next, a method of manufacturing the electronic apparatus according to the present embodiment is described.

Figure 8A:
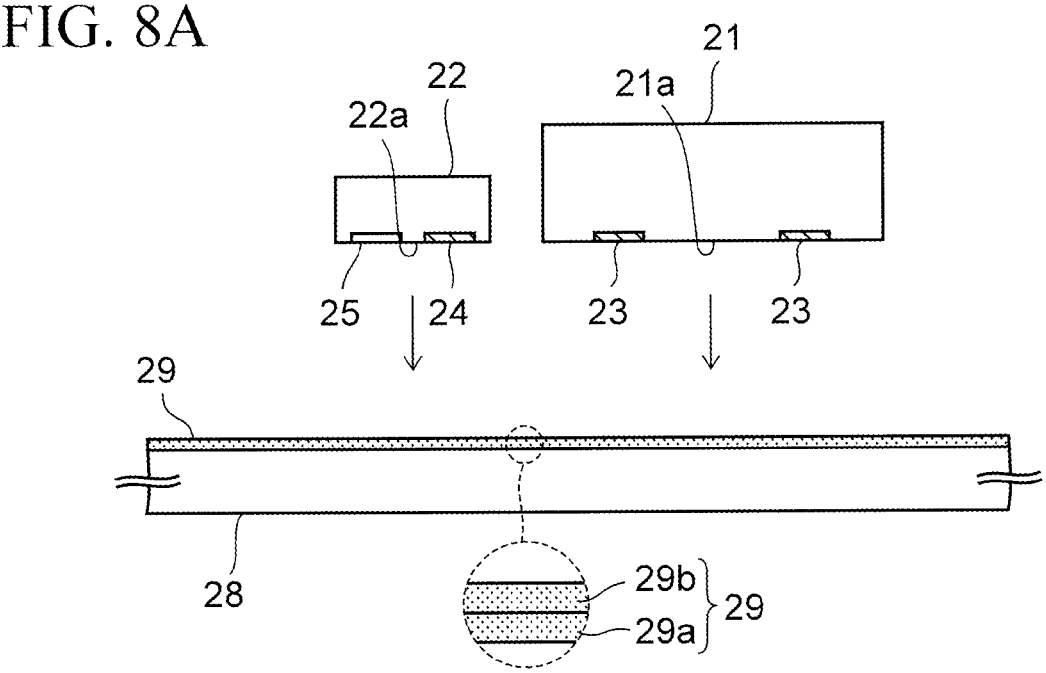
FIGS. 8A to 8N are sectional views illustrating the electronic apparatus in the course of manufacturing thereof according to the present embodiment.
Figure 8B:
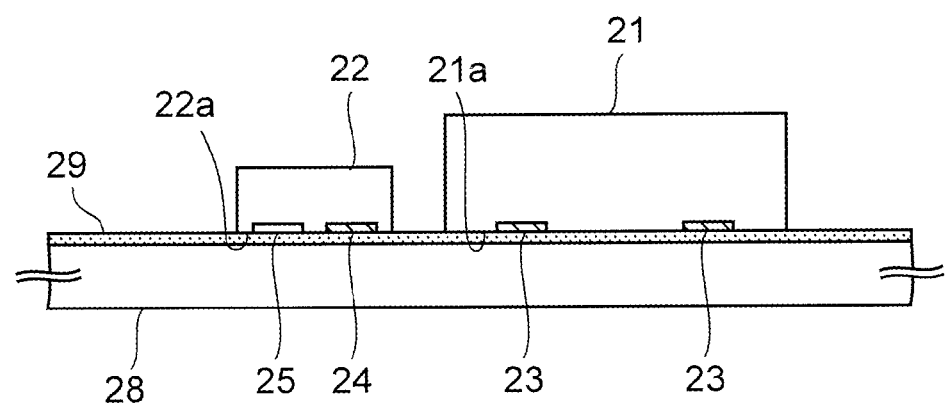
Figure 8C:
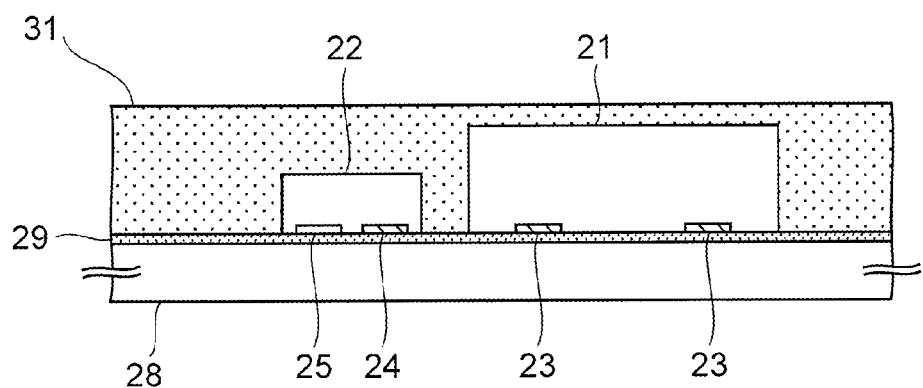
Figure 8D:
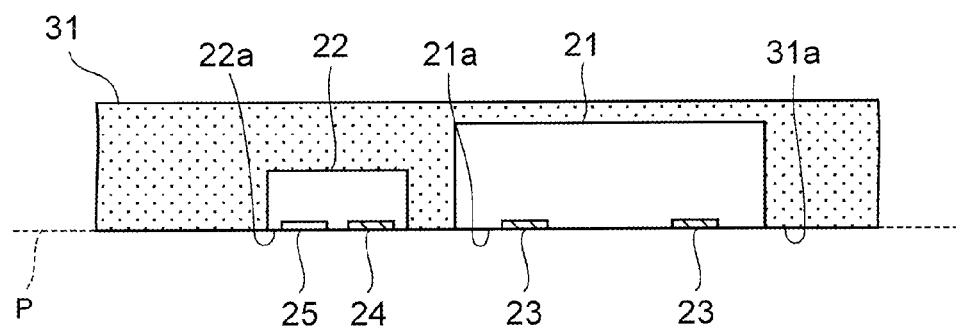
Figure 8E:
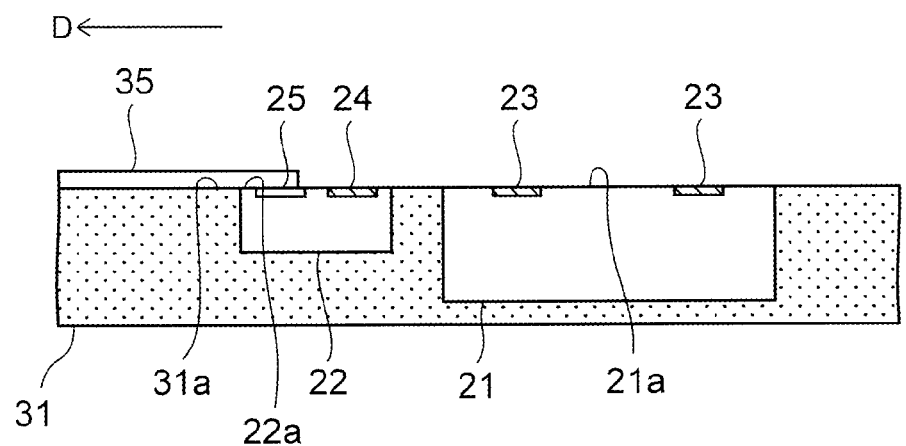
Figure 8F:
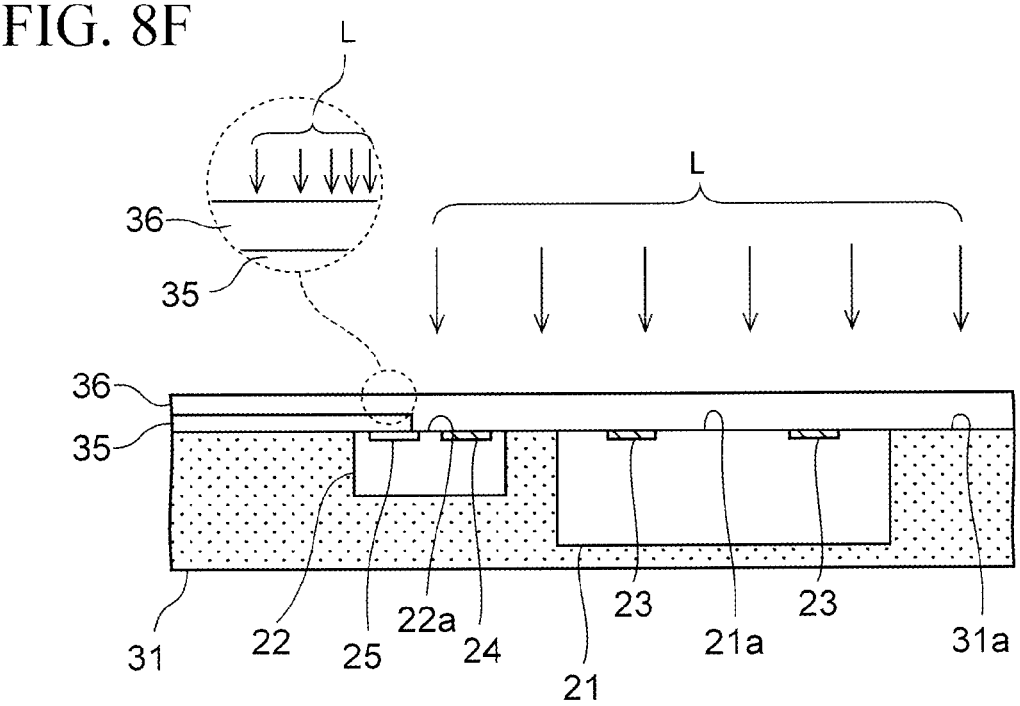
Figure 8G:
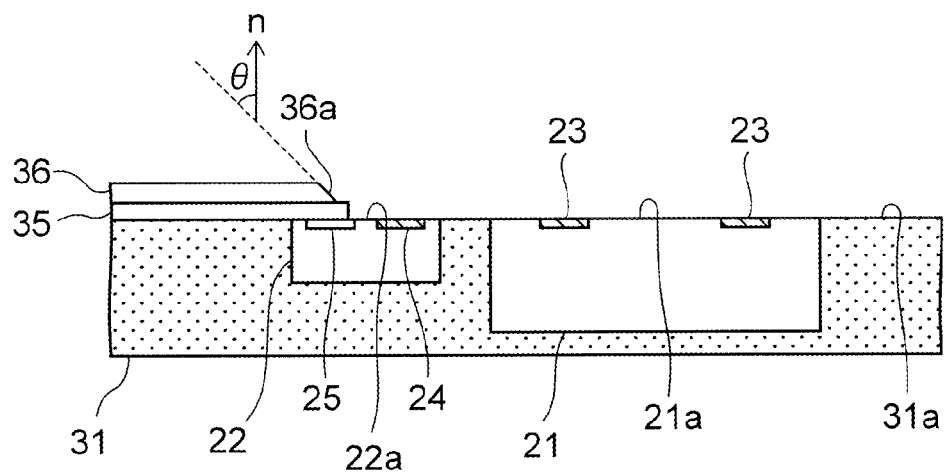
Figure 8H:
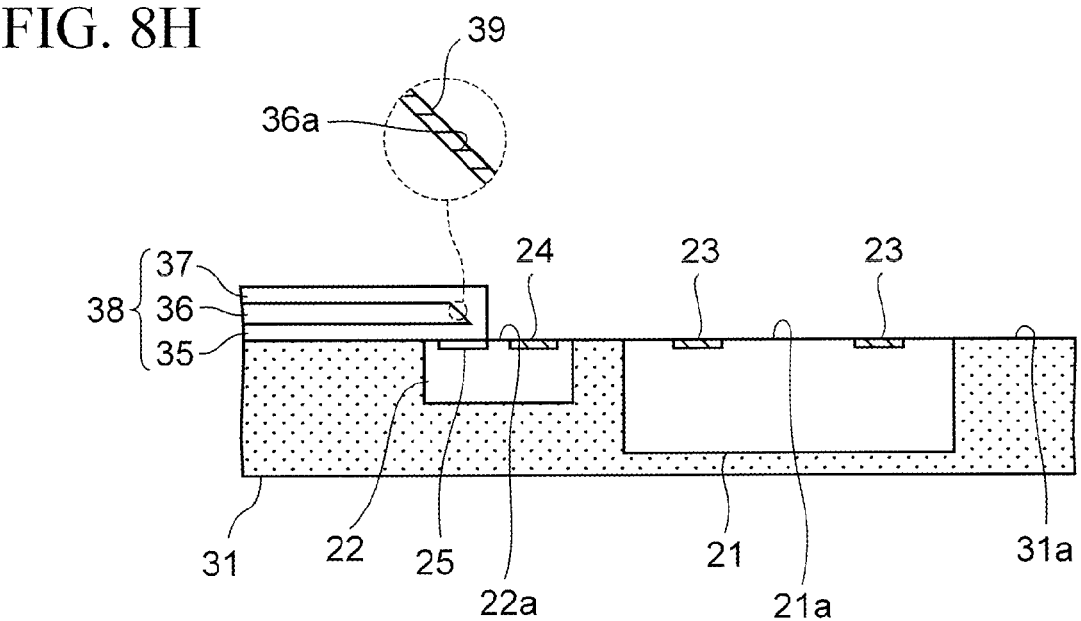
Figure 8I:
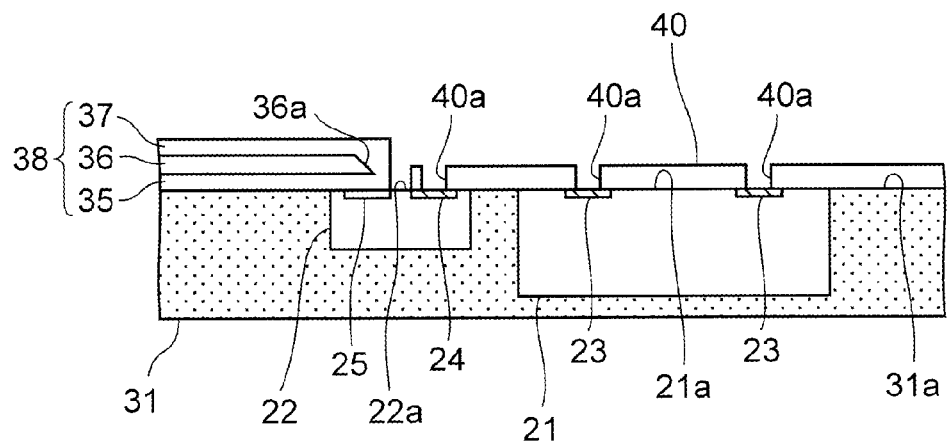
Figure 8J:
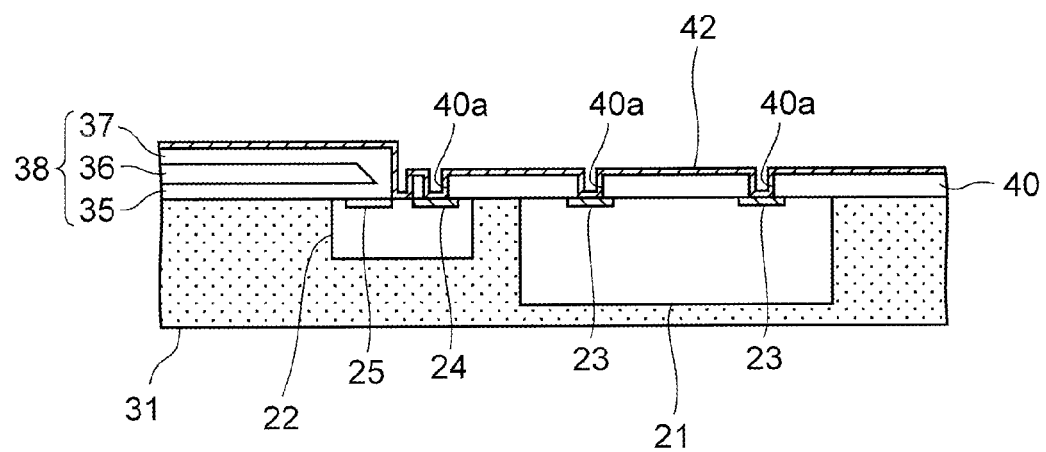
Figure 8K:
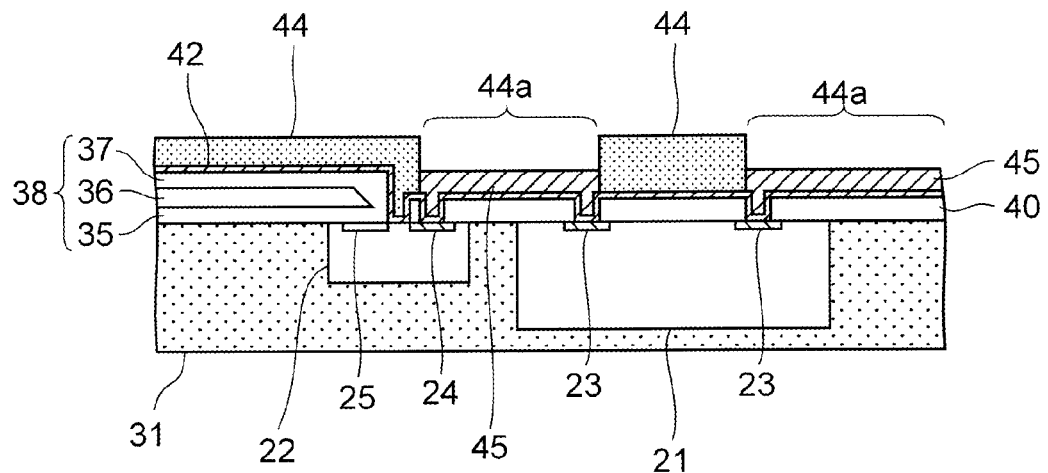
Figure 8L:
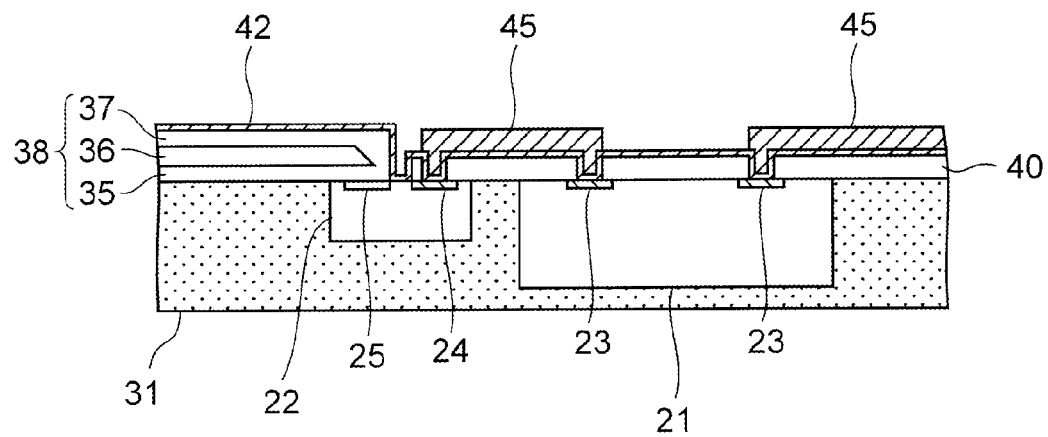
Figure 8M:
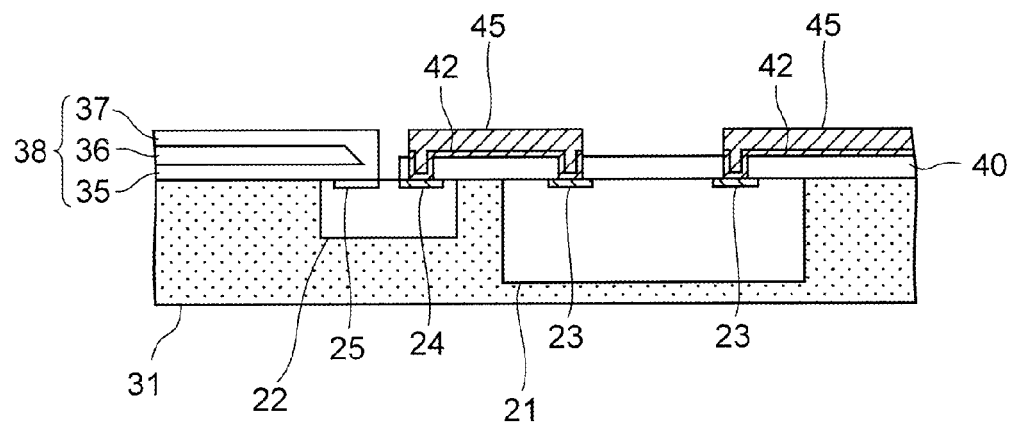
Figure 8N:
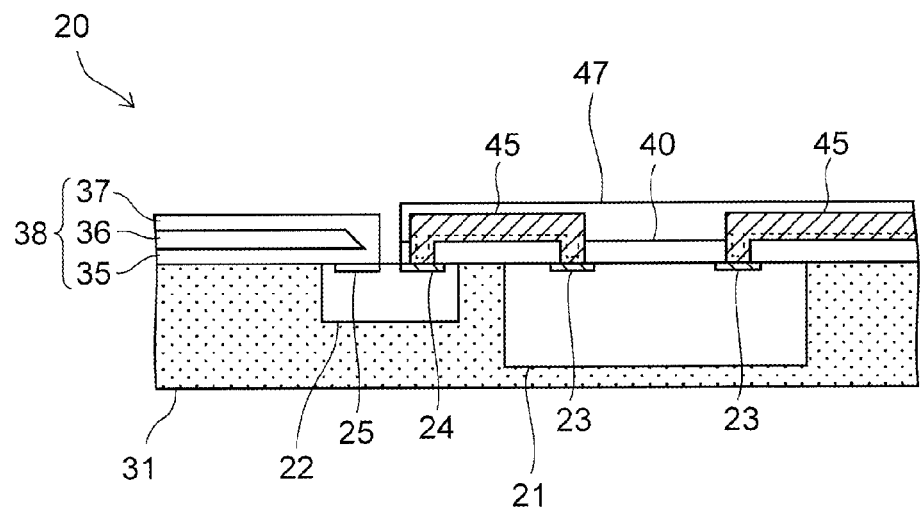

FIGS. 8A to 8N are sectional views illustrating the electronic apparatus in the course of manufacturing thereof according to the present embodiment.

First, as illustrated in FIG. 8A, the circuit element 21 and the optical element 22 described above are prepared. Then, a support 28, whose surface is provided with an adhesive layer 29, is also prepared.

A material for the support 28 is not particularly limited. Any one of a silicon substrate, a glass substrate, an aluminum substrate, a stainless steel substrate, a copper substrate, a polyimide film, and a printed wiring board may be used as the support 28.

The planar shape of the support 28 is either a quadrilateral or a wafer-shaped circle. When the support 28 is quadrilateral, the electronic apparatus can be manufactured with manufacturing facilities for printed wiring boards. When the support 28 is circular, the electronic apparatus can be manufactured with a semiconductor manufacturing apparatus.

Further, the layer structure of the adhesive layer 29 is not particularly limited. Here, the adhesive layer 29 is formed by staking a first adhesive layer 29a of about 50 µm thickness and a second adhesive layer 29b of about 50 µm thickness in this order. The first adhesive layer 29a is made mainly of silicone resin, and the second adhesive layer 29b is formed by applying a silicone-based adhesive onto a polyimide film.

In the surface of the first adhesive layer 29a, crater-shaped protrusions, each having about 2 µm diameter and about 0.3 µm height, are formed in advance with a nano-printing technique, so that the second adhesive layer 29b can be attached to the surface of the first adhesive layer 29a.

As a material for the adhesive layer 29, an epoxy resin, an acrylic resin, a polyimide resin, a urethane resin, and a fluororesin are available in addition to the silicone resin mentioned above. Further, instead of such a two-layer structure, the adhesive layer 29 may be formed of a single adhesive layer.

Then, the circuit element 21 and the optical element 22 are lowered toward the adhesive layer 29 by using an unillustrated flip-chip bonder.

Thereby, as illustrated in FIG. 8B, a structure is formed in which the first main surface 21a of the circuit element 21 and the second main surface 22a of the optical element 22 are bonded onto the support 28.

Note that the height of the circuit element 21 is about 400 µm, and the height of the optical element 22 is about 200 µm. Here, the heights are measured from the surface of the adhesive layer 29.

Next, as illustrated in FIG. 8c, after putting the circuit element 21 and the optical element 22 into an unillustrated mold, a resin for molding is supplied to the inside of the mold and then thermally cured. Thereby, the sealer 31 is formed around the circuit element 21 and optical element 22, so that the circuit element 21 and optical element 22 are sealed by the sealer 31.

In the present embodiment, use of the support 28 not only facilitates handling of the circuit element 21 and the optical element 22, but also prevents the electrodes 23, 24 and the window 25 from being sealed by the sealer 31.

Note that an inorganic filler may be added to the resin for forming the sealer 31 so as to prevent the resin from contracting during the thermal curing. As a material for such an inorganic filler, alumina, silica, aluminum hydroxide, and aluminum nitride, for example, are available.

Next, as illustrated in FIG. 8D, the support 28 is peeled from the first main surface 21a and the second main surface 22a. Thereby, a structure is obtained in which the first main surface 21a, the second main surface 22a, and an upper surface 31a of the sealer 31 are located at the same plane P.

Thereafter, the sealer 31 is thermally cured completely under the conditions of a heating temperature of 150° C. and a heating time of one hour.

Next, as illustrated in FIG. 8E, the first main surface 21a, the second main surface 22a, and the upper surface 31a of the sealer 31 are spin-coated with, as the lower cladding layer 35, an optically transparent and UV (ultraviolet) curable epoxy resin whose refractive index is 1.5.

Although the thickness of the lower cladding layer 35 is not particularly limited, the lower cladding layer 35 is formed with a thickness about 5 µm to 10 µm in this example.

Then, after baking the lower cladding layer 35, the lower cladding layer 35 is exposed and developed by photolithography to remove unnecessary part of the lower cladding layer 35.

The lower cladding layer 35 thus developed is formed in direct contact with the window 25 of the optical element 22 and the upper surface 31a, and extends in the in-plane direction D of the second main surface 22a.

Next, as illustrated in FIG. 8F, the lower clad layer 35, the first main surface 21a, and the second main surface 22a are spin-coated with an optically transparent and positive UV curable epoxy resin of about 5 µm to 10 µm thickness as the core layer 36.

The refractive index of the core layer 36 is 1.55, which is higher than that (1.5) of the lower cladding layer 35.

Then, after baking the core layer 36, the core layer 36 is exposed to exposure light L, which is passing through an unillustrated grayscale mask.

As illustrated in a dotted-line circle, the grayscale mask is used to change the intensity of the exposure light L in a stepwise manner at the end portion of the lower cladding layer 35. A portion of the core layer 36 which is to remain on the lower cladding layer 35 is not irradiated with the exposure light L, and the exposure light L is applied to other portion of the core layer 36.

Next, as illustrated in FIG. 8G, the core layer 36 thus exposed is developed, so that the portion of the core layer 36 irradiated with the exposure light L is removed, and the core layer 36 is left on the lower cladding layer 35.

Here, in the portion of the core layer 36 for which the intensity of the exposure light L is changed in a stepwise manner, a side surface thereof is inclined. Thus, the mirror face 36a, which is inclined at the angle of 45° with respect to the normal direction n of the second main surface 22a, is formed.

Next, a step for obtaining the sectional structure illustrated in FIG. 8H is described.

First, as the reflective film 39, a titanium film of about 30 nm thickness and a gold film of about 100 nm thickness are formed in this order on the entire surface of the core layer 36 by sputtering. Then, the reflective film 39 formed at a portion except for the mirror face 36a is removed by etching.

Then, the core layer 36, the first main surface 21a, and the second main surface 22a are spin-coated with, as the upper cladding layer 37, an optically transparent and UV curable epoxy resin whose refractive index is 1.5. Then, the upper cladding layer 37 is baked. The thickness of the upper cladding layer 37 is, for example, about 5 µm to 10 µm.

Thereafter, the upper cladding layer 37 is exposed and developed by photolithography, so that the upper cladding layer 37 lefts only on the core layer 36 and the reflective film 39.

By these steps, the optical waveguide 38 formed by stacking the lower cladding layer 35, the core layer 36, and the upper cladding layer 37 in this order is completed.

In this way, the optical waveguide 38 is formed by photolithography. The patterning accuracy of the photolithography is determined by the accuracy of alignment between the second main surface 22a and an exposure mask such as the above-mentioned grayscale mask. This accuracy of alignment is much better than the accuracy of alignment between an element and a wiring substrate in the flip-chip mounting. For this reason, in this embodiment, a misalignment between the mirror face 36a and the window 25 can be reduced, thereby suppressing optical signal loss between the optical waveguide 38 and the window 35.

Note that instead of forming the optical waveguide 38 by photolithography in this manner, a sheet-shaped optical waveguide 38 may be prepared in advance and attached to the second main surface 22a and the upper surface 31a with an adhesive.

Next, as illustrated in FIG. 8I, the optical waveguide 38, the first main surface 21a, the second main surface 22a, and the upper surface 31a of the sealer 31 are spin-coated with a photosensitive epoxy varnish of about 8 µm thickness as the first insulating layer 40. Then, after baking the first insulating layer 40, the first insulating layer 40 is exposed and developed, so that openings 40a is formed above the first electrodes 23 and the second electrodes 24, respectively.

Thereafter, the first insulating layer 40 is heated and cured, and further subjected to oxygen plasma treatment, so that the residual first insulating layer 40 in the openings 40a is removed.

Next, as illustrated in FIG. 8J, a titanium layer and a copper layer are formed in this order as a seed layer 42 by sputtering on the optical waveguide 38 and the first insulating layer 40 as well as in the openings 40a.

The thickness of the seed layer 42 is not particularly limited. In this example, the titanium layer is formed in thickness of about 0.1 µm, and the copper layer is formed in thickness of about 0.3 µm. The titanium layer serves as an adhesion layer improving adhesion between the seed layer 42 and its base. As the adhesion layer serving like this, a chromium layer is available other than the titanium layer.

Next, as illustrated in FIG. 8K, a photoresist is applied onto the seed layer 42, and is exposed and developed to form a resist layer 44 having openings 44a.

Then, a copper layer of about 5 µm to 10 µm is grown as the wiring layer 45 on the exposed seed layer 42 in the openings 44a, by electrolytic plating using the seed layer 42 as a power supply layer. Instead of the copper layer, a copper alloy layer made of a copper-nickel alloy or the like may be formed.

The line width of the wiring layer 45 is not particularly limited. In the present embodiment, the line width of the wiring layer 45 is about 20 µm, and a plurality of wiring layer 45 is formed at a distance from each other with an interval of a 20 µm.

Although the wiring layer 45 is formed by forming the copper layer by electrolytic plating in this example, the wiring layer 45 may be formed instead by forming an aluminum layer by sputtering and pattering the aluminum layer by photolithography.

A technique of forming the wiring layer 45 on the circuit element 21 and the optical element 22 in a step different from a step for forming wiring (not illustrated) incorporated by these elements 21, 22 is called a rewiring technique.

Thereafter, as illustrated in FIG. 8L, the resist layer 44 is removed.

Next, as illustrated in FIG. 8M, a portion of the seed layer 42 not covered by the wiring layer 45 is removed by wet etching and dry etching. An etchant usable in the wet etching is not particularly limited. A mixed solution of sulfuric acid and hydrogen peroxide is may be used as an etchant for the copper layer of the seed layer 42, and a solution of hydrogen fluoride may be used as an etchant for the titanium layer of the seed layer 42. Further, an etching gas for the dry etching is not particularly limited, and a carbon tetrafluoride gas may be used as an etching gas for the titanium layer of the seed layer 42.

Next, as illustrated in FIG. 8N, the optical waveguide 38, the wiring layer 45, and the first insulating layer 40 are spin-coated with a photosensitive epoxy varnish as the second insulating layer 47. After that, the second insulating layer 47 is baked. Then, the second insulating layer 47 is exposed and developed, so that the second insulating layer 47 is removed from above the optical waveguide 38 and left only on the wiring layer 45 and the first insulating layer 40.

By these steps, a basic structure of the electronic apparatus 20 according to the present embodiment is completed.

According to the method of manufacturing the electronic apparatus 20, the optical waveguide 38 is already formed when the electronic apparatus 20 is completed. Therefore, there is no need for aligning the optical waveguide 38 and the window 25 of the optical element 22 when the electronic apparatus 20 is used. This suppresses optical signal loss due to the misalignment between the optical waveguide 38 and the window 25.

Although the present embodiment is described in detail above, the present embodiment is not limited to the above. For example, although the only single wiring layer 45 is formed in the above, a multi-layer wiring structure may be formed by alternately stacking insulating layers and the wiring layers 45.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic apparatus comprising:
  a circuit element including
    a first main surface, a side surface, and a back surface opposed to the first main surface, and
    a first electrode located at the first main surface;
  an optical element, which is configured to either transmit or receive an optical signal, including as integral portions of the optical element
    a second main surface located at the same plane with the first main surface, a side surface, and a back surface opposed to the second main surface,
    a second electrode located at the second main surface, and
    a window which is located at the second main surface and through which the optical signal passes;
  a wiring layer provided on the first main surface and the second main surface, the wiring layer electrically connecting the first electrode and the second electrode;
  an optical wave guide, which extends in an in-plane direction of the second main surface, and is in contact with the window to be optically connected to the window, the optical signal passing through the optical wave guide;
  a sealer provided to around the circuit element and the optical element to expose the first main surface and the second main surface and not to expose other surfaces of the circuit element and the optical element,
  wherein the first main surface, the second main surface, and an upper surface of the sealer are located at the same plane,
  the entirety of the side surface and the entirety of the back surface of the circuit element are covered with and contact the sealer, and the entirety of the side surface and the entirety of the back surface of the optical element are covered with and contact the sealer.

2. The electronic apparatus according to claim 1, further comprising:
  an insulating layer being provided on the first main surface and the second main surface and having openings above the first electrode and the second electrode respectively,
  wherein the wiring layer is provided in the openings and on an upper surface of the insulating layer.

3. The electronic apparatus according to claim 1, wherein a portion of the optical waveguide located above the window is provided with a mirror face configured to bend an optical path of the optical signal from a direction normal to the second main surface to the in-plane direction of the second main surface.

4. An electronic device comprising:
  an electronic apparatus;
  wherein the electronic apparatus including:
  a circuit element including
    a first main surface, a side surface, and a back surface opposed to the first main surface, and
    a first electrode located at the first main surface;
  an optical element, which is configured to either transmit or receive an optical signal, including as integral portions of the optical element
    a second main surface located at the same plane with the first main surface, a side surface, and a back surface opposed to the second main surface,
    a second electrode located at the second main surface, and
    a window which is located at the second main surface and through which the optical signal passes;
  a wiring layer provided on the first main surface and the second main surface, the wiring layer electrically connecting the first electrode and the second electrode;
  an optical wave guide, which extends in an in-plane direction of the second main surface, and is in contact with the window to be optically connected to the window, the optical signal passing through the optical wave guide; and
  a sealer provided to around the circuit element and the optical element to expose the first main surface and the second main surface and not to expose other surfaces of the circuit element and the optical element,
  wherein the first main surface, the second main surface, and an upper surface of the sealer are located at the same plane, the entirety of the side surface and the entirety of the back surface of the circuit element are covered with and contact the sealer, and the entirety of the side surface and the entirety of the back surface of the optical element are covered with and contact the sealer.

5. The electronic device according to claim 4, further comprising:
an optical fiber optically connected to the optical waveguide.

6. The electronic device according to claim 4, further comprising:
a wiring substrate on which the electronic apparatus is mounted.

7. A method of manufacturing an electronic apparatus, wherein the electronic apparatus including
a circuit element including
a first main surface, and
a first electrode located at the first main surface;
an optical element, which is configured to either transmit or receive an optical signal, including as integral portions of the optical element
a second main surface located at the same plane with the first main surface,
a second electrode located at the second main surface, and
a window which is located at the second main surface and through which the optical signal passes,
the method comprising:
bonding the first main surface and the second main surface onto a support;
after the bonding, sealing the circuit element and the optical element with a sealer;
after the sealing, peeling the support from the first main surface and the second main surface
forming a wiring layer on the first main surface and the second main surface to electrically connect the first electrode and the second electrode with the wiring layer; and
forming an optical wave guide on the second main surface, where the optical signal passes through the optical wave guide, to be in contact with the window and thus optically connect the optical wave guide and the window.

* * * * *